June 3, 1941.  G. P. MARSDEN  2,244,110

FRUIT BRUSHER

Filed March 17, 1939  2 Sheets-Sheet 1

INVENTOR
GEORGE P. MARSDEN
BY
ATTORNEY

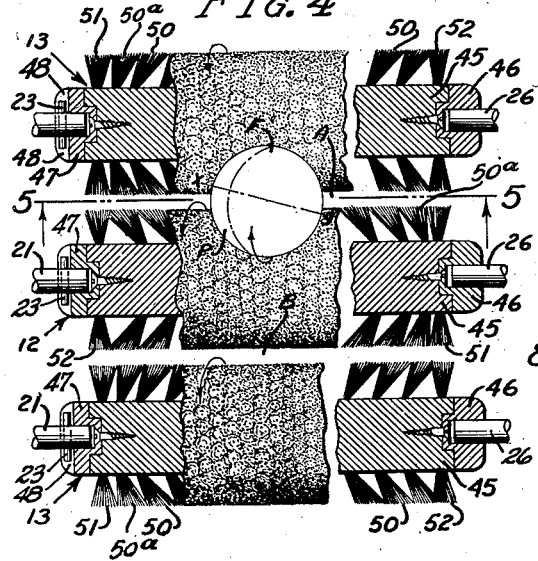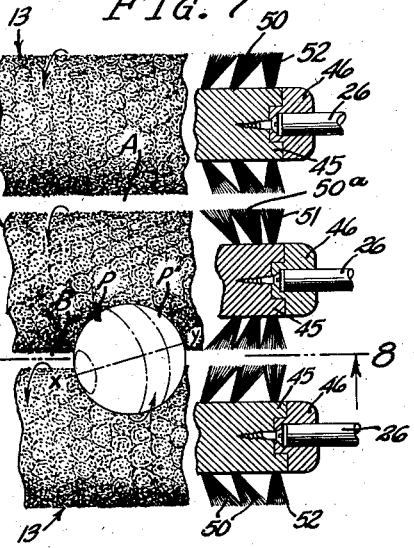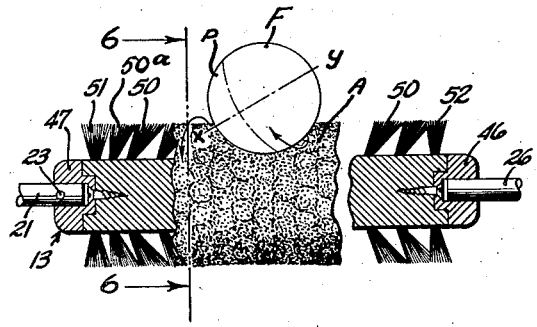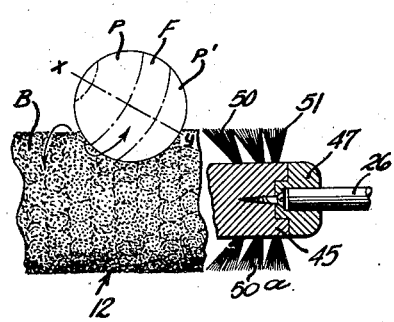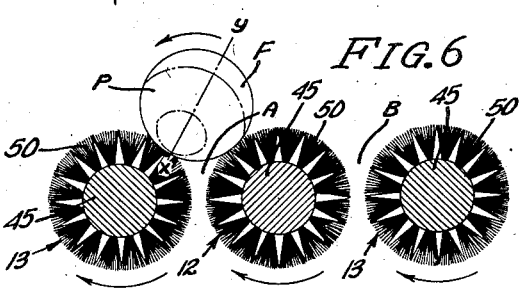

Patented June 3, 1941

2,244,110

UNITED STATES PATENT OFFICE 2,244,110

FRUIT BRUSHER

George P. Marsden, Riverside, Calif., assignor to Food Machinery Corporation, San Jose, Calif., a corporation of Delaware Application March 17, 1939, Serial No. 262,404

1 Claim. (Cl. 15—179)

This invention relates to brushing machines for treating rollable bodies and is particularly useful for cleaning, drying, polishing or otherwise treating fresh, whole fruit or the like.

In the citrus industry, for example, a type of brushing machine commonly used for treating fruit is such as disclosed in United States Patent No. 1,946,023 issued February 6, 1934, to Lloyd E. Jones. This machine includes a frame in which juxtaposed transverse brushes are rotatably mounted to provide a fruit brushing surface, the brushes being power driven in a common direction of rotation. The fruit tends to remain in the valleys formed between adjacent brushes where it is rotated and brushed, suitable means usually being provided to urge the fruit from valley to valley across the brushing surface.

In machines of this type the brushes are usually comprised of cores provided circumferentially with tufts of bristles disposed in radial relation with the axis of rotation of the brush. A fruit body supported in a valley formed between two such rotating brushes is rotated on a horizontal axis by the brushes and when the shape of the body is somewhat elongated the body tends to rotate about its longest axis thus subjecting a relatively small area of the fruit body to substantially more brushing than that received by the end portions adjacent the axis of rotation.

An object of my invention is to provide a fruit brusher embodying juxtaposed brush rolls in which more of the surface of each fruit body is subjected to the scrubbing action of the brushes.

A further object of this invention is the provision of such a brushing machine in which the friction between the brushes and fruit bodies is substantially increased so as to produce a more vigorous scrubbing action on the fruit.

Still another object accomplished by the present invention is the provision of a fruit brushing surface comprised of bristles so arranged as to be more yieldable than those commonly used in the art, thus increasing the area of contact between each fruit body and the brushing surface.

Further objects and advantages will be made manifest in the following description taken in view of the accompanying drawings, in which:

Fig. 1 is a side elevational view of a preferred embodiment of the apparatus of my invention, side portions being broken away to more clearly show the structure thereof.

Fig. 2 is a plan view of the machine shown in Fig. 1, upper portions being broken away to disclose the manner in which the brushing elements are mounted in the machine.

Fig. 3 is a fragmentary, vertical sectional view taken on the line 3—3 of Fig. 1.

Fig. 4 is a fragmentary, diagrammatic plan view of three adjacent brushes of the machine of my invention showing the manner in which a fruit body is brushed, portions of the brushes being broken away to show the arrangement of the bristles.

Fig. 5 is a view taken on the line 5—5 of Fig. 4.

Fig. 6 is a vertical sectional view taken on the line 6—6 of Fig. 5.

Fig. 7 is a view similar to Fig. 4 showing the manner in which a fruit body is rotated by the brushes after being advanced to the next valley from that in which it is shown in Fig. 4.

Fig. 8 is a view taken on the line 8—8 of Fig. 7.

Referring specifically to the drawings, the preferred form of my invention there shown comprises a fruit brusher 10, this including a frame 11, fruit brushes 12 and 13, a cleanout mechanism 14 and power means 15.

The frame 11 has legs 16 upon which longitudinal angle iron frame members 17 and 18 are supported as shown in Fig. 3. Mounted on the member 17 are bearings 20 in which brush drive shafts 21 rotate, each of the latter having a sprocket 22 fixed thereon and being provided with a pin 23 on the inner extremity thereof. Mounted on the member 18 are bearings 25 aligned transversely with the bearings 20 and having studs 26 secured therein by set screws 27. Secured to certain of the bearings 20 and 25 as seen in Fig. 3 are side plates 30 and 31 having fruit guard rails 32 thereon. Mounted on the side plate 30 and frame member 17 as seen in Fig. 3 is a housing 35 having upper and lower chain tracks 36 and 37 respectively provided therein. At opposite ends of the brusher 10 are delivery and discharge drop boards 40 and 41 respectively as shown in Figs. 1 and 2.

The brushes 12 and 13, as shown in Fig. 4, include cylindrical cores 45 having bored end members 46 mounted thereon for rotatably receiving inner ends of the studs 26. Mounted on opposite ends of the cores 45 are drive end members 47 bored to receive extremities of the drive shafts 21 and having slots 48 adapted to receive the pins 23 of the drive shafts 21.

Mounted circumferentially on the cores 45 of the brushes 12 and 13 as shown in Fig. 4, are inclined tufts of bristles 50, the bristles 50 of the brushes 12 being inclined toward the drive end members 47 thereof while those of the brushes 13 are inclined toward the idle end members 46, it being noted that the inclined bristles of each of the brushes 12 and 13 are inclined in a direction opposite to that of the bristles 50 of the brushes adjacent thereto. On the idle ends of the brushes 12 and the drive ends of the brushes 13 (those ends away from which the bristles 50 incline) circumferential rows of radial bristles 51 are mounted for the purpose of filling out the brushing surfaces on these ends of the cores 45. As seen in Fig. 4, the angle of inclination of a circumferential row of the tufts of bristles 50a adjacent the circumferential rows of radial bristles 51 is substantially one-half as great as the angle of inclination of the remaining tufts of inclined bristles 50. The provision of the bristles 50a of lesser angularity between the bristles 50 and 51 prevents the formation of a circumferential break in the brushing surface that would result if the row of bristles 50a of lesser angularity were not interposed between the bristles 50 and 51. On the end of each of the cores 45, opposite the end on which the radial bristles 51 are mounted is another circumferential row of bristles 52 which serve to support the endmost of the inclined bristles 50 and resist the weight of the fruit bodies disposed thereon, it being noted that, without the radial bristles 52, the inclined bristles 52 at this end of the brush would flex considerably under the weight of fruit bodies and become prematurely deformed and inefficient.

As shown in Figs. 1 and 2, the cleanout mechanism 14 includes a driven shaft 55 and an idle shaft 56, these having sprockets 57 thereon about which chains 58 are trained. Carried by the chains 58 and extending transversely therebetween are cleanout members 60 adapted to urge the fruit bodies across the brushes 12 and 13, the members 60 having yieldable fruit engaging fingers 61 provided thereon. The cleanout mechanism 14 is driven from the last drive shaft 21 by a suitable chain drive 62 and gearing 63 as shown in Figs. 1, 2 and 3.

The power means 15, shown diagrammatically in Fig. 1, comprises a shaft 65 having a gear 66 and pulley 67 fixed thereon, this shaft being driven by a belt 68 extending from a motor 69 to the pulley 67. Below the shaft 65 is a counter shaft 70 having a sprocket 71 and gear 72 fixed thereon, the gear 72 meshing with the gear 66 of the shaft 65. Trained about the sprocket 71 of the shaft 70 is a brush drive chain 75 guided by idle sprockets 76, 77 and 78. The upper flight of the chain 75 is carried by the upper chain track 36 while the lower flight is held in mesh with the brush drive sprockets 22 by the lower chain track 37 as shown in Figs. 1 and 3.

Operation

When used in a packing house as a fruit washer, for example, the brusher 10 of this invention is positioned to receive fruit from a soaking tank and to discharge the fruit into a drying unit in a manner familiar in the art, the brusher 10 serving to scrub the fruit bodies to remove surface dirt loosened during the soaking process.

Rotation of the motor 69 is transmitted to the brush drive chain 75 through the belt 68 and gears 66 and 72, the lower flight of the chain 75 being drawn leftward as viewed in Fig. 1 so as to drive all of the brushes 12 and 13 in a clockwise direction. The cleanout chains 58 are driven by the chain 62 and gearing 63 in the direction indicated by the arrow thereon in Fig. 1. The soaked fruit discharged from the aforementioned soaking tank is rolled across the delivery dropboard 40 of the brusher 10 onto the uppermost surfaces of the rotating brushes 12 and 13, the fruit tending to remain in the valleys between the brushes where the fruit bodies are rotated and brushed in a manner described hereinafter. The fruit is caused to progress from valley to valley through the brusher 10 by the feeding of additional fruit to the machine, the fruit in a given valley being displaced and advanced to the next valley by the arrival of the additional fruit at said given valley in the manner disclosed in United States Patent No. 1,957,964 issued May 8, 1934, to Lloyd E. Jones. The cleanout mechanism 14 facilitates the feeding of the fruit through the brusher 10 and also serves to clean out the residual fruit remaining in the brusher 10 at the end of a run.

Referring now to Fig. 4, the valleys between the three adjacent brushes shown therein are indicated at A and B, the direction of rotation of the three brushes being indicated by the arrows thereon. A piece of fruit F in the valley A rotates in the direction indicated by the arrow thereon about an axis X—Y, disposed in angular relation with the axis of rotation of the brushes, this axis being disposed at an angle from the vertical plane as viewed in Fig. 4 and at a greater angle from horizontal as viewed in Fig. 5, the angularity of the axis of rotation of the fruit body being caused by the inclination of the bristles 50.

While in the valley A and being rotated by the adjacent brushes about the axis X—Y, the fruit body F contacts these brushes about a circular zone P defined diagrammatically on the body F in Figs. 4, 5 and 6. As the means of the radii between the axis X—Y and the points at which the brushes contact the fruit body F is substantially less than this mean is where the fruit body rotates about an axis parallel with the brushes, the fruit body F rotates about axis X—Y at a correspondingly higher speed. As more power is required to rotate the body F at this higher speed, the friction between the body F and adjacent brushes is substantially increased resulting in a more vigorous scrubbing of the fruit by the brushes. When the body F is moved from the valley A to the next valley B by the arrival of additional fruit in the valley A or by the cleanout mechanism 14, the angularity of the axis X—Y relative to the axes of the brushes is reversed and the body F is brushed on the circular zone indicated at P' in Figs. 7 and 8.

It is to be noted that the zones P and P' indicated on the fruit body F in Figs. 7 and 8 illustrate the portions of the fruit surface which are brushed when the axis of rotation X—Y of the body is undisturbed as by contact with other fruit bodies or during transfer of the body F from one valley to the next. In actual practice, the axis X—Y tends to remain as shown in either of the two positions shown in Figs. 4 to 8 but contact of other bodies with the body F as well as the advancing of the body from one valley to the next causes the axis X—Y to vary sufficiently to bring the areas of the body F outside of the zones P and P' into contact with the brushes thus resulting in the brushing of the entire surface of the body F rather than only the zones P and P'.

A further advantage resulting in the use of the angular bristles 50 is that the area of contact between a fruit body and these bristles is greater than when radial bristles alone are used. This is due to the greater flexibility of the angular bristles under the weight of the fruit, the latter sinking deeper into the brushing surface of the angular bristles and having a greater portion of its surface brushed than is the case with brushes having radial bristles.

It has been found in actual practice that the amount of suds resulting from the scrubbing of the wet, soapy fruit in the brusher 10 is substantially greater than the amount of suds produced by brushes having only radially disposed bristles. This fact results from the more vigorous scrubbing action of the brushes 12 and 13 and from the greater flexibility of the inclined bristles as compared to radial bristles which flex considerably less than the bristles 50 of the brusher 10.

Although I have shown and described the brusher 10 of my invention as being used to wash fruit, it is to be understood that any other treating process performed on rollable bodies by rotating brushes can be accomplished equally as well by the machine disclosed herein.

I claim as my invention:

In a rotary brush, the combination of: a core; tufts of bristles mounted circumferentially on said core, said tufts being inclined at a substantial angle away from one end of said core; a circumferential row of radially disposed tufts of bristles at the end of said core away from which said first mentioned tufts incline; and a circumferential row of inclined tufts between said first mentioned inclined tufts and said radial tufts, said circumferential row of inclined tufts being inclined away from said radial tufts at an angle substantially less than the angle of inclination of said first mentioned tufts.

GEORGE P. MARSDEN.